(12) United States Patent
Fujimori et al.

(10) Patent No.: US 6,348,559 B1
(45) Date of Patent: Feb. 19, 2002

(54) POLYCARBONATE RESIN AND PROCESS FOR PRODUCING THE SAME

(75) Inventors: Takayasu Fujimori; Kenichi Nakamura, both of Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/605,971

(22) Filed: Jun. 29, 2000

(30) Foreign Application Priority Data

| Jul. 2, 1999 | (JP) | 11-188690 |
| Jul. 2, 1999 | (JP) | 11-188691 |
| Jul. 2, 1999 | (JP) | 11-188692 |
| Jul. 2, 1999 | (JP) | 11-188693 |

(51) Int. Cl.$^7$ ............................................. C08G 64/00
(52) U.S. Cl. ....................................... 528/196; 528/198
(58) Field of Search .......................................... 528/196

(56) References Cited

FOREIGN PATENT DOCUMENTS

JP 64-66234 3/1989 ............ C08G/63/62

OTHER PUBLICATIONS

Patent Abstracts of Japan 01066234 Mar. 13, 1989.

*Primary Examiner*—Terressa M. Boykin
(74) *Attorney, Agent, or Firm*—Sughrue, Mion, Zinn, Macpeak & Seas, PLLC

(57) ABSTRACT

A polycarbonate resin obtainable by reaction of pentacyclopentadecane dimethanol, at least one compound selected from the group consisting of tricyclo $(5.2.1.0^{2,6})$ decane dimethanol, cyclohexane-1,4-dimethanol, decalin-2,6-dimethanol and norbornane dimethanol and carbonic acid diester.

5 Claims, No Drawings

POLYCARBONATE RESIN AND PROCESS FOR PRODUCING THE SAME

BACKGROUND OF THE INVENTION

1) Field of the Invention

The present invention relates to a polycarbonate resin with transparency, heat resistance, a low photoelastic constant and a good property balance between refractive index and Abbe's number, good flowability and a process for producing the same. The polycarbonate resin is suitably applicable to plastic optical products including optical disc substrates, various lenses, prisms and optical fibers and a process for producing the same.

2) Prior Art

A polycarbonate resin obtained by reaction of 2,2-bis (4-hydroxy-phenyl) propane (the so-called bisphenol A) with phosgene or carbonic acid diester is applied widely to not only structural materials, but also optical materials such as optical disc substrates, various lenses, prisms and optical fibers, since it has excellent heat resistance, excellent transparency and furthermore excellent mechanical properties such as impact resistance.

However, the polycarbonate resin made from bisphenol A has a problem in which double refraction becomes large due to molecular orientation and residual stress during molding, since it is a material with low flowability and has a high photoelastic constant. Thus, when an optical material composed of the polycarbonate resin made from bisphenol A is molded, a method for lowering double refraction of its product by molding at a high temperature using a polycarbonate resin with comparatively low molecular weight has been applied. However, since there is a limit for lowering double refraction of the polycarbonate resin produced from bisphenol A, even when the above-mentioned method is applied, a material with further low photoelastic constant and high flowability has been earnestly required in a partial field of optical material, particularly in the field of optical disc with recent expansion of use of optical material.

As a method for lowering a photoelastic constant of a polycarbonate resin, for example, as shown in Japanese Patent Kokai (Laid-open) No.64-66234, copolymerizing bisphenol A with tricyclo ($5.2.1.0^{2,6}$) decane dimethanol is known. However, this method causes deterioration of heat resistance and does not provide sufficient effects in lowering photoelastic constant.

Further, as lens materials, particularly a spectacle lens material, CR-39 (diethyleneglycol bis-arylcarbonate) has been widely used, but it has problems of a low refractive index of 1.50 and low productivity since it is a thermosetting resin. Thus, it has been desired to solve such problems.

SUMMARY OF THE INVENTION

An object of the present invention is to solve above-mentioned prior art problems and provide a poly-carbonate resin which has a lower photoelastic constant than a polycarbonate resin from bisphenol A and a good balance between refractive index and Abbe's number and good flowability and a process for producing the same.

As a result of extensive studies to solve above-mentioned prior art problems, the inventors have found that the problems can be solved by providing a polycarbonate resin derived from pentacyclopentadecane-dimethanol, and at least one compound selected from the group consisting of tricyclo ($5.2.1.0^{2,6}$) decane dimethanol, cyclohexane-1,4-dimethanol, decalin-2,6-dimethanol and norbornane dimethanol and carbonic acid diester and have accomplished the present invention.

That is, the present invention provides a polycarbonate resin obtainable by reaction of pentacyclopentadecane dimethanol, at least one selected from the group consisting of tricyclo ($5.2.1.0^{2,6}$) decane dimethanol, cyclohexane-1,4-dimethanol, decalin-2,6-dimethanol and norbornane dimethanol and carbonic acid diester.

The present invention also provides a process for producing a polycarbonate resin which comprises performing melt polycondensation of pentacyclo-pentadecane dimethanol, at least one compound selected from the group consisting of tricyclo ($5.2.1.0^{2,6}$) decane dimethanol, cyclohexane-1,4-dimethanol, decalin-2,6-dimethanol and norbornane dimethanol and carbonic acid diester in the presence of a basic compound catalyst, thereby obtaining a polycarbonate resin.

DETAILED DESCRIPTION OF THE INVENTION

The polycarbonate resin of the present invention is derived from pentacyclopentadecane dimethanol (hereinafter, referred to as "PCPDM") at least one selected from the group consisting of tricyclo ($5.2.1.0^{2,6}$) decane dimethanol (hereinafter referred to as "TCDDM"), cyclohexane-1,4-dimethanol (hereinafter, referred to as OCHDMII ), decalin-2,6-dimethanol (hereinafter, referred to as "DDM"), and norbornane dimethanol (hereinafter, referred to as a "NBDM") and carbonic acid ester.

PCPDM is a compound(s) represented by the general following formulas (1) and /or (2), and includes a mixture of each isomer thereof in an optional ratio.

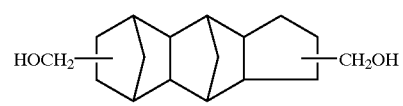

(1)

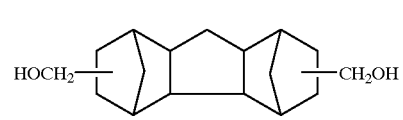

(2)

TCDDM is represented by the following general formula (3), and includes various isomers thereof.

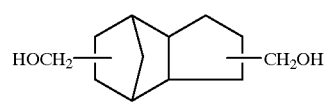

(3)

CHDM is represented by the following chemical formula (4), and includes various isomers thereof.

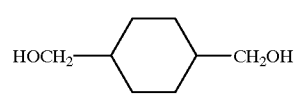

(4)

DDM is represented by the following chemical formula (5), and includes isomers thereof.

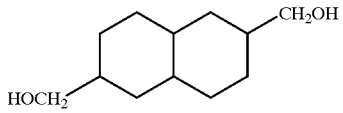

(5)

NBDM is represented by the following general formula (6), and includes various isomers thereof.

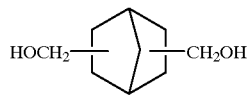

(6)

In the present invention, it is preferable to use 5 to 70 mol % of at least one compound selected from the group consisting of TCDDM, CHDM, DDM and NBDM to total mol of PCPDM and at least one compound selected from the group consisting of TCDDM, CHDM, DDM and NBDM. When the percentage is below 5 mol %, it is not preferable from the aspect of flowability, whereas above 70 mol %, it is not preferable from the aspect of heat resistance.

The polycarbonate resin has a photoelastic constant of $60 \times 10^{-12}$ $m^2/N$ or below and more preferably $50 \times 10^{-12}$ $m^2/N$ or below. When the photoelastic constant is above $60 \times 10^{-12}$ $m^2/N$, it is not preferable since double refraction becomes large, for example, its use as optical disc substrate causes a large error in reading signals.

It is preferable that the polycarbonate resin has a refractive index of 1.53 or above and an Abbe's number of 35 or above. When the refractive index is below 1.53, it is not preferable that when plastic lenses are formed of the polycarbonate resin, it is necessary to make the lenses thick. When Abbe's number is below 35, it is not preferable that when plastic spectacle lenses formed of the polycarbonate resin is used, abuse such as fatigue of eyes readily occurs.

Further, in the polycarbonate resin of the present invention, even if its glass transition temperature (Tg) to indicate heat resistance is allowed to change, each change of photoelastic constant, refractive index and Abbe's number is very small.

Examples of the carbonic acid diester of the present invention, include diphenyl carbonate, ditolylcarbonate, bis (chlorophenyl) carbonate, di-m-cresyl carbonate, dinaphthyl carbonate, dimethyl carbonate, diethyl carbonate, dibutyl carbonate, dicyclohexyl carbonate, among which diphenyl carbonate is preferable.

A molar ratio of preferably 0.97 to 1.10 mol and more preferably 0.99 to 1.04 mol of carbonic acid ester per total 1 mol of PCPDM and at least one compound selected from the group consisting of TCDDM, CHDM, DDM and NBDM is used.

The polystyrene conversion weight average molecular weight of the polycarbonate resin is preferably 20,000 to 200,000 and more preferably 30,000 to 130,000. When the polystyrene conversion weight average molecular weight is below 20,000, strength of molding article is insufficient, whereas above 200,000, it is not preferable since flowability during molding deteriorates.

In the process for producing the polycarbonate resin, basic compound is used as catalyst. Examples of the basic compound include alkali metal compounds, alkaline earth metal compounds, nitrogen-containing compounds and phosphorus-containing compounds.

Examples of the alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, petassium stearate, cesium stearate, lithium stearate, sodium borohydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, sodium tetraphenyl borate, and each sodium salt, potassium salt, cesium salt and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate calcium stearate, strontium stearate, barium stearate, calcium benzoate, magnesium phenylphosphate, each magnesium salt, calcium salt, strontium salt and barium salt of phenol.

Examples of the nitrogen-containing compound and phosphorus-containing compound include quaternary ammonium hydroxides having alkyl group, aryl group or aralkyl group including tetramethylammonium hydroxide, tetraethylammonium hydroxide, tetrapropylammonium hydroxide, tetrabutylammonium hydroxide and trimethylbenzilammonium hydroxide, tertiary amines including triethyamine, dimethylbenzilamine and triphenylamine, secondary amines including diethylamine, dibutylamine and diphenylamine, primary amines including butylamine, pentylamine, hexylamine, decylamine and aniline, imidazoles including 2-methylimidazole, 2-phenylimidazole and benzoimidazol and basic salts including ammonia, tetramethylammonium borohydride, tetrabutylammonium borohydride, tetrabutylammonium tetraphenylborate, tetraphenylammonium tetraphenylborate and tetraphenylphosphonium tetraphenylborate.

The catalyst is used in a molar ratio of $10^{-9}$ to $10^{-3}$ mol and preferably $10^{-7}$ to $10^{-4}$ mol per total 1 mol of PCPDM and at least one compound selected from the group consisting of TCDDM, CHDM, DDM and NBDM. When the molar ratio is below $10^{-9}$, it is not preferable since satisfactory polymerization activity cannot be secured, whereas above $10^{-3}$ it is not prefereble since coloration of the resin becomes remarkable.

The transesterification in the present invention can be performed by known melt poly-condensation process. That is, melt polycondensation is performed by transesterification with heating under atmospheric pressure or a reduced pressure using above-mentioned raw materials and catalyst while removing by-products.

The reaction is usually performed in multiple stages of two stages or above. The first stage reaction is performed at a temperature of 120 to 260° C. and preferably 180 to 240° C. for 0.1 to 5 hours and preferably 0.5 to 3 hours. Then, the reaction is performed while increasing the degree of reduced pressure in the reaction system and elevating the reaction temperature and finally polycondensation is performed under a reduced pressure of 1 mmHg or below at a temperature of 200 to 300° C. for 3 to 10 hours. Such reaction may be performed in a continuous process or in a batch wise. The reaction apparatus to be used in above-mentioned reaction may a vertical type reaction apparatus equipped with anchor type stirring blade, maxblend stirring blade helical-ribbon type stirring blade, etc., a horizontal type reaction apparatus equipped with paddle blade, lattice blade, spectacle shaped blade and an extruder type reaction apparatus equipped with a screw and in the continuous process it is suitable to use a combination of above-mentioned reaction apparatuses.

In the process of producing the polycarbonate resin, after the completion of the polymerization reaction, the catalyst is removed or deactivated in order to maintain heat stability and hydrolysis stability of the polycarbonate resin thus obtained. Usually, a method for deactivating the catalyst by addition of known acid substance or a derivative thereof is suitably applied.

Examples of the acid substance or the derivative thereof include aromatic sulfonic acids including p-toluene sulfonic acid, aromatic sulfonates including butyl p-toluenesulfonate and hexyl p-toluene-sulfonate, aromatic sulfonic acid phosphonium salts including dodecylbenzene sulfonic acid tetrabutyl phosphonium salt, phosphoric acids including phosphoric acid and phosphorous acid, organic halides including stearyl chloride, benzoyl chloride and p-toluene-sulfonyl chloride, alkyl sulfate including dimethyl sulfate and organic halides including benzil chloride.

After the deactivation of the catalyst, a step to remove low boiling point compounds in the polymer with vaporization under a pressure of 0.1 to 1 mmHg at a temperature of 200 to 300° C. may be added. For its purpose, a horizontal apparatus equipped with a stirring blade with excellent surface renewing capacity such as paddle blade, lattice blade, spectacle shaped blade, etc. or thin film vaporizer is suitably used.

In the present invention, in addition to above-mentioned heat stabilizer and hydrolysis stabilizer, additives such as an antioxidant, dye, pigment, a reinforcing agent, a filler, an ultraviolet absorber, a lubricating agent, a releasing agent, a crystal nuclear agent, a plasticizer, a flowability improving agent, an antistatic agent, an antibacterial agent, etc, may be used.

Regarding the timing to add above-mentioned additives, they may be added during which melting state of the polycarbonate resin is maintained just after the reaction or further added after pelletizing the polycarbonate resin. In the addition of plural additives, the timing of addition may be changed, respectively.

Where the additives are added to the polycarbonate resin in which melting state is maintained just after the reaction, a process comprising adding them to the resin withdrawn from the reactor, then transferring it into a horizontal kneading machine to knead uniformly and then pelletizing or a process comprising transferring the resin withdrawn from the reactor into a horizontal kneading machine and adding them via side feed to the kneading machine to knead uniformly and then pelletizing is suitably applied.

When they are added to a pelletized resin, a process comprising mixing and dispersing the pellets and above-mentioned additives and agents with a mixer including, typically, a tumbler mixer, a Henschel mixer, a ribbon blender, a super mixer and then melt kneading with a kneading machine such as an extruder, Bumbary mixer, rolls are suitably selected.

PREFERRED EMBODIMENTS OF THE INVENTION

The present invention will be described in more detail below, referring to Examples, which are not intended to limit the scope of the present invention.

EXAMPLE 1

49.9 g (0.19 mol) of pentacyclopentadecane dimethanol (hereinafter "PCPDM" ), 2.0 g (0.01 mol) tricyclo $(5.2.1.0^{2,6})$ decane dimethanol (hereinafter, referred to as "TCDDM"), 43.3 g (0.202 mol) of diphenyl carbonate and $5 \times 10^{-4}$ g ($6 \times 10^{-6}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200 ° C. for 40 minutes and the transesterification reaction was performed. The temperature was further elevated up to 225° C. at the rate of 75° C. /hr, and after 40 minutes of the completion of elevation of the temperature, the reduced pressure degree was set to 1 mmHg or below over one hour while maintaining 225° C. Then, the temperature was elevated up to 235° C. at the rate of 105° C./hr and the reaction was performed with stirring for total 6 hours. After the completion of the reaction, nitrogen was injected into the interior of the reactor to return to atmospheric pressure and a polycarbonate resin thus produced was withdrawn. The measured results of the properties of the polycarbonate resin was shown in Table 1.

EXAMPLE 2

The experiment was performed in the same manner as in Example 1 except that 36.7 g (0.14 mol) of PCPDM, 11.8 g (0.06 mol) of TCDDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 1.

EXAMPLE 3

The experiment was performed in the same manner as in Example 1 except that 15.7 g (0.06 mol) of PCPDM, 27.5 g (0.14 mol) of TCDDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 1.

COMPARATIVE EXAMPLE 1

The experiment was performed in the same manner as in Example 1 except that 39.3 g (0.2 mol) of TCDDM, 43.3 g (0.202 mol) of diphenyl carbonate and $5 \times 10^{-4}$ g ($6 \times 10^{-6}$ mol) of sodium hydrogencarbonate were used and PCPDM was not used. The measured results of the properties of the polycarbonate resin was shown in Table 1.

COMPARATIVE EXAMPLE 2

The measured results of the properties of a polycarbonate resin derived from bisphenol A, manufactured by Mitsubishi Engineering Plastics k.k., Japan, trade name : IUPILON H-4000 was shown in Table 1.

EXAMPLE 4

49.9 g (0.19 mol) of PCPDM, 1.4 g (0.01 mol) of cyclohexane-1,4-dimethanol (hereinafter, referred to as "CHDM"), 43.3 g (0.202 mol) of diphenyl carbonate and $5 \times 10^{-4}$ g ($6 \times 10^{-6}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200° C. for 40 minutes and the transesterification reaction was performed. The temperature was further elevated up to 225° C. at the rate of 75° C./hr, and after 40 minutes of the completion of elevation of the temperature, the reduced pressure degree was set to 1 mmHg or below over one hour while maintaining 225° C. Then, the temperature was elevated up to 235° C. at the rate of 105° C./hr and the reaction was performed with stirring for total 6 hours. After the completion of the reaction, nitrogen was injected into the interior of the reactor to return to atmospheric pressure and a polycarbonate resin thus produced was withdrawn. The measured results of the properties of the polycarbonate resin was shown in Table 2.

EXAMPLE 5

The experiment was performed in the same manner as in Example 4 except that 36.7 g (0.14 mol) of PCPDM, 8.7 g (0.06 mol) of CHDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 2.

EXAMPLE 6

The experiment was performed in the same manner as in Example 4 except that 15.7 g (0.06 mol) of PCPDM, 20.2 g (0.14 mol) of CHDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 2.

COMPARATIVE EXAMPLE 3

The experiment was performed in the same manner as in Example 4 except that 28.8 g (0.2 mol) of CHDM, 43.3 g (0.202 mol) of diphenyl carbonate and $5 \times 10^{-4}$ g ($6 \times 10^{-6}$ mol) of sodium hydrogencarbonate were used and PCPDM was not used. The measured results of the properties of the polycarbonate resin was shown in Table 2.

EXAMPLE 7

49.9 g (0.19 mol) of PCPDM, 2.0 g (0.01 mol) of decalin-2,6-dimethanol (hereinafter, referred to as "DDM"), 43.3 g (0.202 mol) of diphenyl carbonate and $5 \times 10^{-4}$ g ($6 \times 10^{-6}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200° C. for 40 minutes and the transesterification reaction was performed. The temperature was further elevated up to 225° C. at the rate of 75° C./hr, and after 40 minutes of the completion of elevation of the temperature, the reduced pressure degree was set to 1 mmHg or below over one hour while maintaining 225° C. Then, the temperature was elevated up to 235° C. at the rate of 105° C. /hr and the reaction was performed with stirring for total 6 hours. After the completion of the reaction, nitrogen was injected into the interior of the reactor to return to atmospheric pressure and a polycarbonate resin thus produced was withdrawn. The measured results of the properties of the polycarbonate resin was shown in Table 3.

EXAMPLE 8

The experiment was performed in the same manner as in Example 7 except that 36.7 g (0.14 mol) of PCPDM, 11.9 g (0.06 mol) of DDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 3.

EXAMPLE 9

The experiment was performed in the same manner as in Example 7 except that 15.7 g (0.06 mol) of PCPDM, 27.8 g (0.14 mol) of DDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 3.

COMPARATIVE EXAMPLE 4

The experiment was performed in the same manner as in Example 7 except that 39.7 g (0.2 mol) of DDM, 43.3 g (0.202 mol) of diphenyl carbonate and $5 \times 10^{-4}$ g ($6 \times 10^{-6}$ mol) of sodium hydrogencarbonate were used and PCPDM was not used. The measured results of the properties of the polycarbonate resin was shown in Table 3.

EXAMPLE 10

49.9 g (0.19 mol) of PCPDM, 1.6 g (0.01 mol) of norbornane dimethanol (hereinafter, referred to as "NBDM"), 43.3 g (0.202 mol) of diphenyl carbonate and $5 \times 10^{-4}$ g ($6 \times 10^{-6}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200 ° C. for 40 minutes and the transesterification reaction was performed. The temperature was further elevated up to 225° C. at the rate of 75° C./hr, and after 40 minutes of the completion of elevation of the temperature, the reduced pressure degree was set to 1 mmHg or below over one hour while maintaining 225° C. Then, the temperature was elevated up to 235 ° C. at the rate of 105° C./hr and the reaction was performed with stirring for total 6 hours. After the completion of the reaction, nitrogen was injected into the interior of the reactor to return to atmospheric pressure and a polycarbonate resin thus produced was withdrawn. The measured results of the properties of the polycarbonate resin was shown in Table 4.

EXAMPLE 11

The experiment was performed in the same manner as in Example 10 except that 36.7 g (0.14 mol) of PCPDM, 9.4 g (0.06 mol) of NBDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 4.

EXAMPLE 12

The experiment was performed in the same manner as in Example 10 except that 15.7 g (0.06 mol) of PCPDM, 21.9 g (0.14 mol) of NBDM, 43.3 g (0.202 mol) of diphenyl carbonate and $5 \times 10^{-4}$ g ($6 \times 10^{-6}$ mol) of sodium hydrogencarbonate were used. The measured results of the properties of the polycarbonate resin was shown in Table 4.

COMPARATIVE EXAMPLE 5

The experiment was performed in the same manner as in Example 10 except that 31.2 g (0.2 mol) of NBDM, 43.3 g (0.202 mol) of diphenyl carbonate and $5 \times 10^{-4}$ g ($6 \times 10^{-6}$ mol) of sodium hydrogencarbonate were used and PCPDM was not used. The measured results of the properties of the polycarbonate resin was shown in Table 4.

The properties in Tables 1 to 4 were measured according to the following methods.

[Refractive Index ($n_D$) and Abbe's Number ($v_D$)]

The measurement was performed by refractometer of ATAGO.

[(Polystyrene Converted Weight Average Molecular Weight (Mw)]

The measurement was performed by GPC (Gel Permeation Chromatography) using monodispersed polystyrene having a known molecular weight as standard substance and chloroform as developing solvent.

[Glass Transition Temperature (Tg)]

The measurement was performed by a differential scanning calorimeter.

[Thermal Decomposition Starting Temperature (Td)]

A temperature at which sample weight was decreased by 1% in a nitrogen stream was measured by a thermobalance. The temperature elevation rate was 10 °C./min.

[Photoelastic Constant]

A light of laser wave length 633 nm was applied to a cast film of each sample of thickness 100 μm by Ellipsomater, whereby double refraction for change of load was measured and photoelastic constant was calculated based on the measured results.

[Q Value]

The measurement was performed using a die of height 10 mm and pore diameter 1 mm at a resin temperature of 240° C. in a residence time of 6 minute under a cylinder pressure of 160 kgf/cm² by a flow tester.

The following abbreviations were used for the compounds in Table.

PCPDM : pentacyclopentadecanedimethanol

TCDDM : tricyclo (5.2.1.0$^{2,6}$) decane 'dimethanol

CHDM : cyclohexane-1,4-dimethanol

DDM : decalin-2,6-dimethanol

NBDM : norbornane dimethanol

H-4000: polycarbonate resin derived from bisphenol A

The polycarbonate resin of the present invention is a novel aliphatic copolycarbonate resin with a low photoelastic constant, excellent transparency and heat resistance, good flowability and a good balance between refractive index and Abbe's number in which each change of refractive index, Abbe's number and photoelastic constant with change of glass transition temperature indicating heat resistance is very small and very usefully applicable to materials of plastic optical products such as optical disc substrates, various lenses, prisms and optical fibers.

TABLE 1

| Example & Com.Ex. | Example 1 | Example 2 | Example 3 | Comp. Ex. 1 | Comp. Ex. 2 |
|---|---|---|---|---|---|
| Molar ratio of TCDDM/PCPDM | 5/95 | 30/70 | 70/30 | 100/0 | H-4000 |
| Refractive index ($n_D$) | 1.537 | 1.537 | 1.573 | 1.537 | 1.586 |

TABLE 1-continued

| Example & Com.Ex. | Example 1 | Example 2 | Example 3 | Comp. Ex. 1 | Comp. Ex. 2 |
|---|---|---|---|---|---|
| Abbe's number ($v_D$) | 49 | 49 | 49 | 48 | 30 |
| Mw | 65400 | 68100 | 65000 | 66700 | 34500 |
| Tg (° C.) | 133 | 120 | 100 | 82 | 145 |
| Td (° C.) | 334 | 330 | 332 | 334 | 445 |
| Photoelastic constant ($10^{-12}$ m²/N) | 12 | 12 | 12 | 13 | 78 |
| Q value (cm³/sec) | 0.10 | 0.15 | 0.24 | 0.32 | 0.094 |

TABLE 2

| Example & Com.Ex. | Example 4 | Example 5 | Example 6 | Comp. Ex. 3 |
|---|---|---|---|---|
| Molar ratio of CHDM/PCPDM | 5/95 | 30/70 | 70/30 | 100/0 |
| Refractive index ($n_D$) | 1.537 | 1.537 | 1.536 | 1.535 |
| Abbe's number ($v_D$) | 49 | 49 | 48 | 48 |
| Mw | 65200 | 65700 | 67000 | 66100 |
| Tg (° C.) | 132 | 118 | 98 | 77 |
| Td (° C.) | 334 | 333 | 333 | 332 |
| Photoelastic constant ($10^{-12}$ m²/N) | 12 | 12 | 13 | 15 |
| Q value (cm³/sec) | 0.11 | 0.17 | 0.27 | 0.40 |

TABLE 3

| Example & Com.Ex. | Example 7 | Example 8 | Example 9 | Comp. Ex. 4 |
|---|---|---|---|---|
| Molar ratio of DDM/PCPDM | 5/95 | 30/70 | 70/30 | 100/0 |
| Refractive index ($n_D$) | 1.537 | 1.537 | 1.537 | 1.537 |
| Abbe's number ($v_D$) | 49 | 49 | 49 | 48 |
| Mw | 67200 | 65800 | 66600 | 68400 |
| Tg (° C.) | 132 | 119 | 100 | 82 |
| Td (° C.) | 335 | 334 | 335 | 332 |
| Photoelastic constant ($10^{-12}$ m²/N) | 12 | 12 | 12 | 13 |
| Q value (cm³/sec) | 0.11 | 0.16 | 0.25 | 0.31 |

TABLE 4

| Example & Com.Ex. | Example 10 | Example 11 | Example 12 | Comp. Ex. 5 |
|---|---|---|---|---|
| Molar ratio of NBDM/PCPDM | 5/95 | 30/70 | 70/30 | 100/0 |
| Refractive index ($n_D$) | 1.537 | 1.537 | 1.536 | 1.535 |
| Abbe's number ($v_D$) | 49 | 49 | 48 | 48 |
| Mw | 64700 | 66000 | 65800 | 64300 |
| Tg (° C.) | 133 | 120 | 101 | 83 |
| Td (° C.) | 332 | 333 | 332 | 334 |

TABLE 4-continued

| Example & Com.Ex. | Example 10 | Example 11 | Example 12 | Comp. Ex. 5 |
|---|---|---|---|---|
| Photoelastic constant ($10^{-12}$ m$^2$/N) | 12 | 12 | 12 | 13 |
| Q value (cm$^3$/sec) | 0.11 | 0.16 | 0.23 | 0.32 |

What is claimed is:

1. A polycarbonate resin obtainable by reaction of pentacyclopentadecane dimethanol, at least one compound selected from the group consisting of tricyclo $(5.2.1.0^{2,6})$ decane dimethanol, cyclohexane-1,4-dimethanol, decalin-2,6-dimethanol and norbornane dimethanol and carbonic acid diester.

2. A polycarbonate resin according to claim 1, using 0.97 to 1.10 mol of carbonic acid diester per total 1 mol of pentacyclopentadecane dimethanol and at least one compound selected from the group consisting of tricyclo $(5.2.1.0^{2,6})$ decane dimethanol, cyclohexane-1,4-dimethanol, decalin-2,6-dimethanol and norbornane dimethanol.

3. A polycarbonate resin according to claim 1, having a photoelastic constant of $60 \times 10^{-12}$ m$^2$/N or below.

4. A process for producing a polycarbonate resin which comprises performing melt polycondensation of pentacyclopentadecane dimethanol, at least one compound selected from the group consisting of tricyclo $(5.2.1.0^{2,6})$ decane dimethanol, cyclohexane-1,4-dimethanol, decalin-2,6-dimethanol and norbornane dimethanol and carbonic acid diester in the presence of a basic compound catalyst, thereby obtaining a polycarbonate resin.

5. A process according to claim 4, using $10^{-9}$ to $10^{-3}$ mol of the basic compound catalyst to total 1 mol of pentacyclopentadecane dimethanol and at least one compound selected from the group consisting of tricyclo $(5.2.1.0^{2,6})$ decane dimethanol, cyclohexane-1,4-dimethanol, decalin-2,6-dimethanol and norbornane dimethanol.

* * * * *